United States Patent
Ratasuk et al.

(10) Patent No.: US 11,968,683 B2
(45) Date of Patent: Apr. 23, 2024

(54) APPARATUS, METHOD AND COMPUTER PROGRAM

(71) Applicant: NOKIA TECHNOLOGIES OY, Espoo (FI)

(72) Inventors: Rapeepat Ratasuk, Hoffman Estates, IL (US); Srinivasan Selvaganapathy, Bangalore (IN); Haitao Li, Beijing (CN); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 537 days.

(21) Appl. No.: 17/267,990

(22) PCT Filed: Aug. 13, 2018

(86) PCT No.: PCT/CN2018/100256
§ 371 (c)(1),
(2) Date: Feb. 11, 2021

(87) PCT Pub. No.: WO2020/034066
PCT Pub. Date: Feb. 20, 2020

(65) Prior Publication Data
US 2021/0219330 A1    Jul. 15, 2021

(51) Int. Cl.
*H04W 72/23*    (2023.01)
*H04L 1/1867*    (2023.01)

(52) U.S. Cl.
CPC .......... *H04W 72/23* (2023.01); *H04L 1/1887* (2013.01)

(58) Field of Classification Search
CPC ... H04L 1/1812; H04L 1/1822; H04L 1/1854; H04L 1/1887; H04L 1/1896; H04L 5/0044; H04W 4/70; H04W 72/23
See application file for complete search history.

(56) References Cited

U.S. PATENT DOCUMENTS 8,730,889 B2 * 5/2014 Kim ................. H04L 1/1896
370/476
9,584,300 B2 * 2/2017 Yang .................. H04W 52/146
(Continued)

FOREIGN PATENT DOCUMENTS

CN    104104486 A  * 10/2014  .......... H04L 1/1812
CN    107371270 A    11/2017
(Continued)

OTHER PUBLICATIONS

Ericsson, Scheduling of multiple DL/UL transport blocks in NB-IoT, Aug. 20, 2018, 3GPP TSG-RAN WG1 Meeting #94, Gothenburg, Sweden, Agenda Item: 6.2.2.3, Tdoc: R1-1808045 (Year: 2018).*

(Continued)

*Primary Examiner* — Eric Nowlin
(74) *Attorney, Agent, or Firm* — SQUIRE PATTON BOGGS (US) LLP

(57) ABSTRACT

There is provided an apparatus, said apparatus comprising means for receiving, at a user equipment, a scheduling grant for a first number, M, of transport blocks, wherein the scheduling grant comprises an indication of a second number, N, of transport blocks to be transmitted or received before a time delay, wherein M is greater than 1 and N is less than or equal to M, causing transmission or reception of a first group of N transport blocks and, if N is less than M, after the time delay, causing transmission or reception of a further group of up to N transport blocks followed by the time delay, until M transport blocks are caused to be transmitted or received.

17 Claims, 11 Drawing Sheets

(56) References Cited

U.S. PATENT DOCUMENTS

| | | | |
|---|---|---|---|
| 9,729,297 B2* | 8/2017 | Seo | H04L 5/0055 |
| 9,867,138 B2* | 1/2018 | Yang | H04W 52/281 |
| 9,980,234 B2* | 5/2018 | Yang | H04W 72/20 |
| 10,129,856 B2* | 11/2018 | Cheng | H04L 1/1812 |
| 10,172,096 B2* | 1/2019 | Yang | H04W 52/281 |
| 10,178,690 B2* | 1/2019 | Nader | H04W 72/1268 |
| 10,341,061 B2* | 7/2019 | Chen | H04W 72/1273 |
| 10,355,828 B2* | 7/2019 | Vajapeyam | H04L 5/0055 |
| 10,412,733 B2* | 9/2019 | Sun | H04W 72/23 |
| 10,454,657 B2* | 10/2019 | Bhattad | H04L 5/0005 |
| 10,454,658 B2* | 10/2019 | Bhattad | H04L 27/261 |
| 10,454,659 B2* | 10/2019 | Bhattad | H04L 5/0048 |
| 10,568,081 B2* | 2/2020 | Papasakellariou | H04W 52/325 |
| 10,667,228 B2* | 5/2020 | Dinan | H04J 11/00 |
| 10,721,025 B2* | 7/2020 | Jeon | H04W 72/23 |
| 10,721,052 B2* | 7/2020 | Bhattad | H04L 5/1469 |
| 10,764,021 B2* | 9/2020 | Bhattad | H04W 72/21 |
| 10,892,860 B2* | 1/2021 | Wang | H04W 72/53 |
| 11,044,739 B2* | 6/2021 | Li | H04L 1/1812 |
| 11,159,278 B2* | 10/2021 | Xue | H04L 1/1614 |
| 11,184,907 B2* | 11/2021 | Bagheri | H04W 72/23 |
| 11,641,646 B2* | 5/2023 | Bagheri | H04W 72/1268 370/330 |
| 2011/0205996 A1* | 8/2011 | Kim | H04L 5/0055 370/329 |
| 2015/0341865 A1* | 11/2015 | Yang | H04W 72/0453 455/522 |
| 2015/0349936 A1* | 12/2015 | Seo | H04L 1/1864 370/277 |
| 2016/0249340 A1* | 8/2016 | Cheng | H04L 1/1861 |
| 2016/0261382 A1* | 9/2016 | Vajapeyam | H04L 1/1812 |
| 2017/0026297 A1* | 1/2017 | Sun | H04L 47/25 |
| 2017/0064640 A1* | 3/2017 | Yang | H04L 27/2607 |
| 2017/0099128 A1* | 4/2017 | Gao | H04W 74/06 |
| 2017/0099664 A1 | 4/2017 | Lunttila et al. | |
| 2017/0273056 A1* | 9/2017 | Papasakellariou | H04W 52/146 |
| 2017/0288819 A1* | 10/2017 | Chen | H04W 72/0446 |
| 2017/0303205 A1* | 10/2017 | Yang | H04L 1/1854 |
| 2018/0220375 A1* | 8/2018 | Yang | H04L 5/0055 |
| 2018/0242315 A1* | 8/2018 | Sun | H04W 72/23 |
| 2018/0248671 A1* | 8/2018 | Bhattad | H04L 5/0012 |
| 2018/0248672 A1* | 8/2018 | Bhattad | H04L 1/08 |
| 2018/0248673 A1* | 8/2018 | Bhattad | H04L 5/22 |
| 2018/0248674 A1* | 8/2018 | Bhattad | H04L 5/0092 |
| 2018/0248675 A1* | 8/2018 | Bhattad | H04L 5/0007 |
| 2018/0279247 A1* | 9/2018 | Dinan | H04J 11/00 |
| 2018/0367255 A1* | 12/2018 | Jeon | H04W 72/23 |
| 2019/0349960 A1* | 11/2019 | Li | H04L 1/1887 |
| 2019/0356430 A1* | 11/2019 | Cheng | H04W 72/23 |
| 2019/0363833 A1* | 11/2019 | Wang | H04L 1/1819 |
| 2019/0386780 A1* | 12/2019 | Zou | H04L 1/1657 |
| 2020/0106560 A1* | 4/2020 | Cheng | H04W 72/23 |
| 2020/0146034 A1* | 5/2020 | Bagheri | H04W 72/1268 |
| 2020/0367270 A1* | 11/2020 | Nader | H04W 72/1273 |
| 2021/0266105 A1* | 8/2021 | Lei | H04W 28/04 |
| 2022/0039128 A1* | 2/2022 | Bagheri | H04W 72/1268 |
| 2022/0095359 A1* | 3/2022 | Wei | H04L 1/1812 |
| 2022/0210802 A1* | 6/2022 | Hwang | H04L 1/1614 |
| 2022/0330312 A1* | 10/2022 | Zhou | H04L 1/1854 |
| 2023/0345475 A1* | 10/2023 | Huang | H04L 1/1854 |

FOREIGN PATENT DOCUMENTS

| | | | | |
|---|---|---|---|---|
| CN | 107682931 A | | 2/2018 | |
| CN | 107852704 A | | 3/2018 | |
| CN | 108322284 A | | 7/2018 | |
| CN | 108605342 A | * | 9/2018 | H04L 1/08 |
| CN | 108809534 A | * | 11/2018 | H04L 1/0643 |
| CN | 107409020 B | * | 9/2020 | H04L 1/1812 |
| CN | 112930706 A | * | 6/2021 | H04L 1/08 |
| CN | 113273272 A | * | 8/2021 | H04L 1/1812 |
| CN | 109845157 B | * | 9/2021 | H04L 1/0061 |
| CN | 108605342 B | * | 10/2021 | H04L 1/08 |
| CN | 113796147 A | * | 12/2021 | H04L 1/0025 |
| CN | 108809534 B | * | 7/2022 | H04L 1/0643 |
| CN | 111357368 B | * | 7/2022 | H04L 1/0643 |
| CN | 115276915 A | * | 11/2022 | H04L 1/0643 |
| EP | 3145105 A1 | * | 3/2017 | H04L 1/1671 |
| EP | 3403455 B1 | * | 7/2019 | H04L 1/08 |
| EP | 2984778 B1 | * | 1/2020 | H04L 1/1812 |
| EP | 3 827 633 A1 | | 6/2021 | |
| EP | 3944537 A1 | * | 1/2022 | H04L 1/0025 |
| ES | 2751924 T3 | * | 4/2020 | H04L 1/08 |
| JP | 2017524289 A | * | 8/2017 | |
| JP | 2018512772 A | * | 5/2018 | |
| JP | 2019503145 A | * | 1/2019 | |
| JP | 6664497 B2 | * | 3/2020 | H04L 1/08 |
| JP | 6952870 B2 | * | 10/2021 | H04L 1/0061 |
| KR | 20150140629 A | * | 12/2015 | |
| KR | 20160041025 A | * | 4/2016 | |
| KR | 20190139241 A | * | 12/2019 | |
| KR | 20210151100 A | * | 12/2021 | |
| KR | 102356204 B1 | * | 2/2022 | |
| KR | 102367373 B1 | * | 2/2022 | |
| KR | 102499381 B1 | * | 2/2023 | |
| RU | 2703964 C1 | * | 10/2019 | H04L 1/08 |
| WO | WO 2009/157859 A2 | | 12/2009 | |
| WO | WO-2010050688 A2 | * | 5/2010 | H04L 1/1812 |
| WO | WO-2014168329 A1 | * | 10/2014 | H04L 1/1812 |
| WO | WO-2015192322 A1 | * | 12/2015 | H04L 1/1671 |
| WO | WO-2016140926 A1 | * | 9/2016 | H04L 1/1812 |
| WO | WO 2017/167538 A1 | | 10/2017 | |
| WO | WO-2018028325 A1 | * | 2/2018 | |
| WO | WO 2018/133769 A1 | | 7/2018 | |
| WO | WO 2020/032695 A1 | | 2/2020 | |
| WO | WO-2020032681 A1 | * | 2/2020 | |
| WO | WO-2020089869 A1 | * | 5/2020 | H04L 1/08 |
| WO | WO-2020146964 A1 | * | 7/2020 | |
| WO | WO-2020147492 A1 | * | 7/2020 | H04L 1/1812 |
| WO | WO-2020226356 A1 | * | 11/2020 | H04L 1/0025 |

OTHER PUBLICATIONS

Huawei et al., Discussion on scheduling multiple DL/UL transport blocks for SC-PTM and unicast, Aug. 20, 2018, 3GPP TSG-RAN WG1 Meeting #94, Gothenburg, Sweden, Agenda Item: 6.2.2.3, Tdoc: R1-1808109 (Year: 2018).*

Sierra Wireless, Multiple Transport Block Grant for Unicast, Aug. 20, 2018, 3GPP TSG-RAN WG1 Meeting #94, Gothenburg, Sweden, Agenda Item: 6.2.2.3, Tdoc: R1-1808356 (Year: 2018).*

Nokia et al., Scheduling of multiple DL/UL transport blocks, Aug. 20, 2018, 3GPP TSG-RAN WG1 Meeting #94, Gothenburg, Sweden, Agenda Item: 6.2.2.3, Tdoc: R1-1808441 (Year: 2018).*

LG Electronics, Discussion on multiple transmission blocks scheduling in NB-IoT, Aug. 20, 2018, 3GPP TSG RAN WG1 Meeting #94, Gothenburg, Sweden, Agenda Item: 6.2.2.3, Tdoc: R1-1808476 (Year: 2018).*

ZTE, Consideration on scheduling enhancement for NB-IoT, Aug. 20, 2018, 3GPP TSG RAN WG1 Meeting #94, Gothenburg, Sweden, Agenda Item: 6.2.2.3, Tdoc: R1-1808476 (Year: 2018).*

Qualcomm Incorporated, Scheduling of multiple DL/UL transport blocks, Aug. 20, 2018, 3GPP TSG RAN WG1 Meeting #94, Gothenburg, Sweden, Agenda Item: 6.2.2.3, Tdoc: R1-1809033 (Year: 2018).*

Lenovo et al., Design of scheduling of multiple DL/UL transport blocks for Rel. 16 NBIOT, Aug. 20, 2018, 3GPP TSG RAN WG1 Meeting #94, Gothenburg, Sweden, Agenda Item: 6.2.2.3, Tdoc: R1-1808559 (Year: 2018).*

ZTE, Feature lead summary of scheduling enhancement for NB-IoT, Aug. 20, 2018, 3GPP TSG RAN WG1 Meeting #94, Gothenburg, Sweden, Agenda Item: 6.2.2.3, Tdoc: R1-1809523 (Year: 2018).*

International Search Report and Written Opinion dated May 10, 2019 corresponding to International Patent Application No. PCT/CN2018/100256.

Notice of Reasons for Rejection (non-final) dated Mar. 29, 2022 corresponding to Japanese Patent Application No. 2021-507576, with English Summary thereof.

Office Action dated Mar. 27, 2023, corresponding to Indonesian Patent Application No. P00202101449.

(56) References Cited

OTHER PUBLICATIONS

First Examination Report dated Feb. 3, 2022 corresponding to Indian Patent Application No. 202147010081.
Extended European Search Report dated Feb. 25, 2022 corresponding to European Patent Application No. 18930153.4.
Samsung, "Discussion on scheduling of multiple TBs for NB-Iot," 3GPP Draft; R1-1808739, 3GPP TSG RAN WG1 Meeting #94, Gothenburg, Sweden, Aug. 11, 2018, XP051516112.
Sony, "Support of scheduling of multiple DL/UL transport blocks for MTC," 3GPP Draft; R1-1808349, 3GPP TSG RAN WG1 Meeting #94, Gothenburg, Sweden, Aug. 11, 2018, XP051515731.
Nokia et al., "Scheduling of multiple DL/UL transport blocks," 3GPP Draft; R1-1808441, 3GPP TSG RAN WG1 Meeting #94, Gothenburg, Sweden, Aug. 11, 2018, XP051515823.
Notice of Preliminary Rejection dated Oct. 23, 2023 corresponding to Korean Patent Application No. 2021-7007387, with English summary thereof.
First Office Action dated Jan. 19, 2024 corresponding to Chinese Patent Application No. 201880096646.0, with English Summary thereof.

* cited by examiner

APPARATUS, METHOD AND COMPUTER PROGRAM

FIELD

The present application relates to a method, apparatus, system and computer program and in particular but not exclusively to scheduling multiple transport blocks in narrowband Internet of Things (NB-IoT) and enhanced machine-type communication (eMTC) systems.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for receiving, at a user equipment, a scheduling grant for a first number, M, of transport blocks, wherein the scheduling grant comprises an indication of a second number, N, of transport blocks to be transmitted or received before a time delay, wherein M is greater than 1 and N is less than or equal to M, causing transmission or reception of a first group of N transport blocks; and, if N is less than M, after the time delay, causing transmission or reception of a further group of up to N transport blocks followed by the time delay, until M transport blocks are caused to be transmitted or received.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may comprise means for receiving or providing feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may comprise means for receiving or providing feedback associated with the at least one HARQ process identifier.

The apparatus may comprise means for receiving or providing feedback associated with a plurality of transport blocks.

In a second aspect there is provided an apparatus, said apparatus comprising means for providing, to a user equipment, a scheduling grant for a first number, M, of transport blocks, wherein the scheduling grant comprises an indication of a second number, N, of transport blocks to be transmitted or received by the user equipment before a time delay, wherein M is greater than 1 and N is less than or equal to M, receiving a transmission from the user equipment, or causing reception at the user equipment, of a first group of N transport blocks and, if N is less than M, after the time delay, receiving a transmission from the user equipment, or causing reception at the user equipment, of a further group of up to N transport blocks followed by the time delay, until M transport blocks are caused to be transmitted from the user equipment or caused to be received at the user equipment.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may comprise means for receiving or providing feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may comprise means for receiving or providing feedback associated with the at least one HARQ process identifier.

The apparatus may comprise means for receiving or providing feedback associated with a plurality of transport blocks.

In a third aspect there is provided a method, said method comprising receiving, at a user equipment, a scheduling grant for a first number, M, of transport blocks, wherein the scheduling grant comprises an indication of a second number, N, of transport blocks to be transmitted or received before a time delay, wherein M is greater than 1 and N is less than or equal to M, causing transmission or reception of a first group of N transport blocks; and, if N is less than M, after the time delay, causing transmission or reception of a further group of up to N transport blocks followed by the time delay, until M transport blocks are caused to be transmitted or received.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The method may comprise receiving or providing feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The method may comprise receiving or providing feedback associated with the at least one HARQ process identifier.

The method may comprise receiving or providing feedback associated with a plurality of transport blocks.

In a fourth aspect there is provided a method comprising providing, to a user equipment, a scheduling grant for a first number, M, of transport blocks, wherein the scheduling grant comprises an indication of a second number, N, of transport blocks to be transmitted or received by the user equipment before a time delay, wherein M is greater than 1 and N is less than or equal to M, receiving a transmission from the user equipment, or causing reception at the user equipment, of a first group of N transport blocks and, if N is less than M, after the time delay, receiving a transmission from the user equipment, or causing reception at the user equipment, of a further group of up to N transport blocks followed by the time delay, until M transport blocks are caused to be transmitted from the user equipment or caused to be received at the user equipment.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may comprise means for receiving or providing feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may comprise means for receiving or providing feedback associated with the at least one HARQ process identifier.

The apparatus may comprise means for receiving or providing feedback associated with a plurality of transport blocks.

In a fifth aspect there is provided an apparatus comprising: at least one processor and at least one memory including a computer program code, the at least one memory and computer program code configured to, with the at least one processor, cause the apparatus at least to receive, at a user equipment, a scheduling grant for a first number, M, of transport blocks, wherein the scheduling grant comprises an indication of a second number, N, of transport blocks to be transmitted or received before a time delay, wherein M is greater than 1 and N is less than or equal to M, cause transmission or reception of a first group of N transport blocks; and, if N is less than M, after the time delay, cause transmission or reception of a further group of up to N transport blocks followed by the time delay, until M transport blocks are caused to be transmitted or received.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may be configured to receive or provide feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may be configured to receive or provide feedback associated with the at least one HARQ process identifier.

The apparatus may be configured to receive or provide feedback associated with a plurality of transport blocks.

In a sixth aspect there is provided an apparatus comprising: at least one processor and at least one memory including a computer program code, the at least one memory and computer program code configured to, with the at least one processor, cause the apparatus at least to provide, to a user equipment, a scheduling grant for a first number, M, of transport blocks, wherein the scheduling grant comprises an indication of a second number, N, of transport blocks to be transmitted before a time delay, wherein M is greater than 1 and N is less than or equal to M, receive a transmission from the user equipment, or causing reception at the user equipment, of a first group of N transport blocks and, if N is less than M, after the time delay, receive a transmission from the user equipment, or cause reception at the user equipment of a further group of up to N transport blocks followed by the time delay, until M transport blocks are caused to be transmitted from the user equipment or caused to be received at the user equipment.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may be configured to receive or provide feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may be configured to receive or provide feedback associated with the at least one HARQ process identifier.

The apparatus may be configured to receive or provide feedback associated with a plurality of transport blocks.

In a seventh aspect there is provided a computer readable medium comprising program instructions for causing an apparatus to perform at least the following receiving, at a user equipment, a scheduling grant for a first number, M, of transport blocks, wherein the scheduling grant comprises an indication of a second number, N, of transport blocks to be transmitted before a time delay, wherein M is greater than 1 and N is less than or equal to M, causing transmission or reception of a first group of N transport blocks and, if N is less than M, after the time delay, causing transmission or reception of a further group of up to N transport blocks followed by the time delay, until M transport blocks are caused to be transmitted or received.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may be caused to perform receiving or providing feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may be caused to perform receiving or providing feedback associated with the at least one HARQ process identifier.

The apparatus may be caused to perform receiving or providing feedback associated with a plurality of transport blocks.

In an eighth aspect there is provided a computer readable medium comprising program instructions for causing an apparatus to perform at least the following providing, to a user equipment, a scheduling grant for a first number, M, of transport blocks, wherein the scheduling grant comprises an indication of a second number, N, of transport blocks to be transmitted before a time delay, wherein M is greater than 1 and N is less than or equal to M, receiving a transmission from the user equipment or causing reception at the user equipment, of a first group of N transport blocks and, if N is less than M, after the time delay, receiving a transmission from the user equipment or causing reception at the user equipment of a further group of up to N transport blocks followed by the time delay, until M transport blocks are caused to be transmitted from the user equipment or caused to be received at the user equipment.

The scheduling grant may comprise an indication of the first number, M, of transport blocks.

The scheduling grant may comprise an indication of a time delay value between transmission or reception of successive groups of up to N transport blocks.

The scheduling grant may comprise an indication of a time delay between transmission or reception of the transport blocks within a group of up to N transport blocks.

The scheduling grant may comprise an indication of whether to cause interlaced transmission or reception of the transport blocks with a group of N transport blocks.

The apparatus may be caused to perform receiving or providing feedback for the transmission or reception of each group of up to N transport blocks, respectively, wherein the feedback is received or provided after the transmission or reception of the up to N transport blocks and before a successive transmission or reception of the up to N transport blocks.

The feedback may comprise HARQ feedback.

N may be less than or equal to the number of HARQ processes supported by the user equipment.

The scheduling grant may comprise an indication of at least one HARQ process identifier.

The apparatus may be caused to perform receiving or providing feedback associated with the at least one HARQ process identifier.

The apparatus may be caused to perform receiving or providing feedback associated with a plurality of transport blocks.

In a ninth aspect there is provided a non-transitory computer readable medium comprising program instructions for causing an apparatus to perform the method of the first aspect or the method of the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
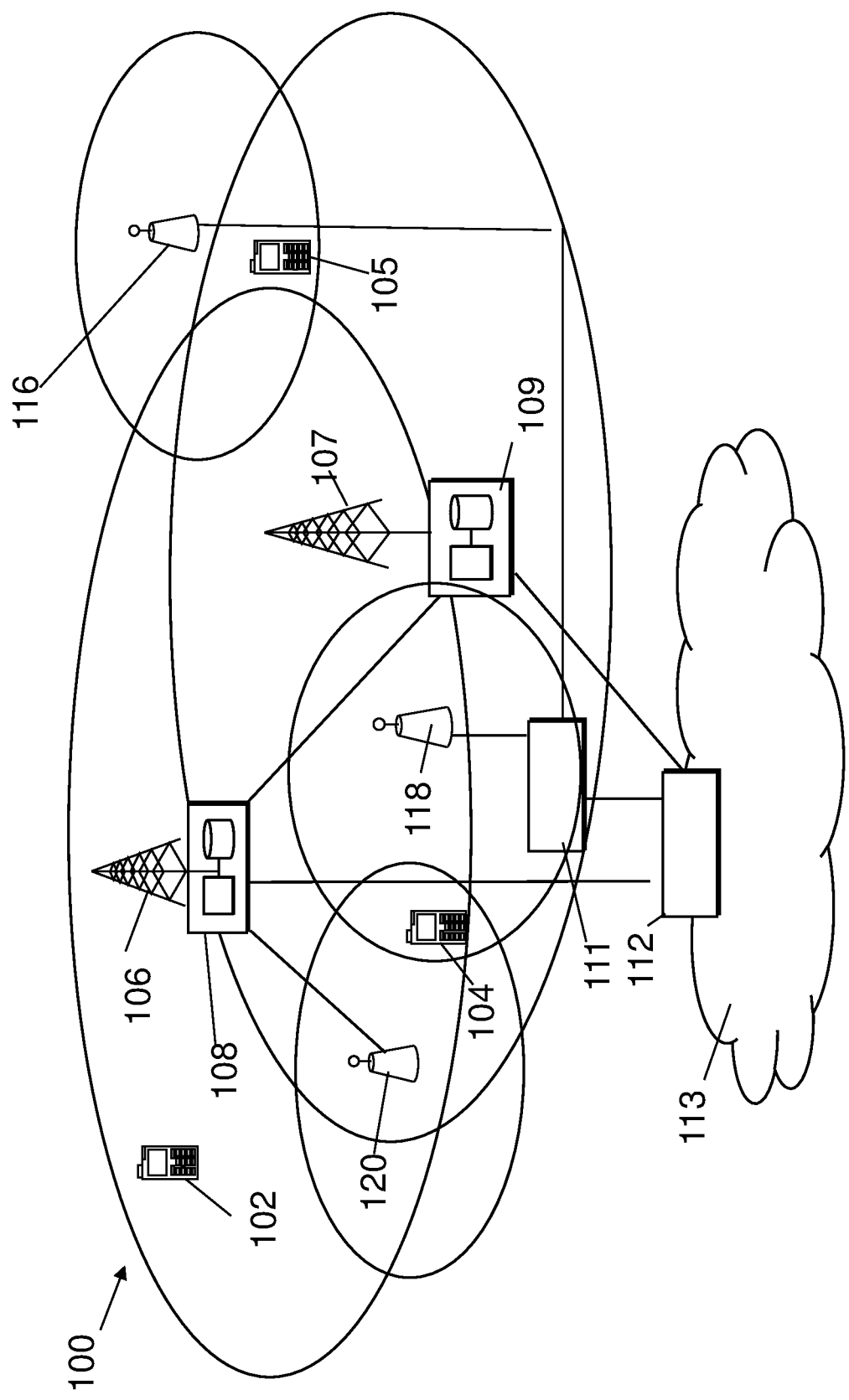
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
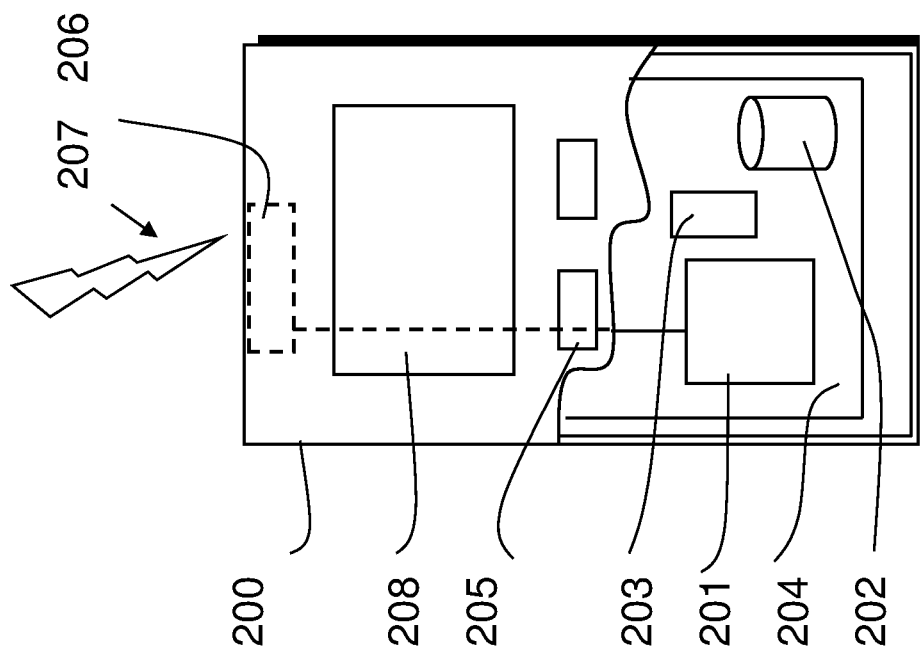
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
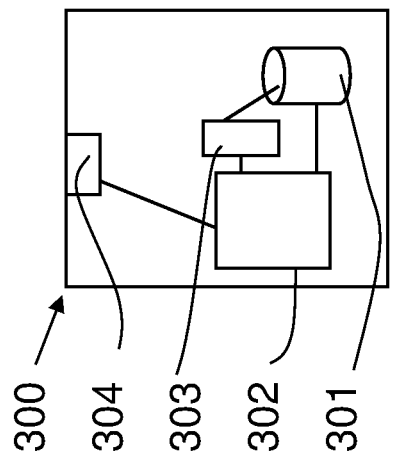
FIG. 3 shows a schematic diagram of an example control apparatus.

FIG. 3 shows an example of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Proposed enhancements as part of 4G LTE standards for Rel-16 include enhanced machine type communication (eMTC) and narrowband internet-of-things (NB-IoT) to support internet of things (IoT) technology. In NB-IoT and eMTC, UEs in poor radio conditions may only transmit a limited amount of data in each transmission.

However, an IoT data packet may be relatively big (e.g. 100 or 200 bytes), considering TCP/IP and other higher-layer overhead. Therefore, each data packet is transmitted using several transmissions. Each transmission requires a scheduling grant. A scheduling grant may be provided to a UE for an UL or DL transmission (i.e. a transmission from a UE to an NW or a transmission from a NW received at a UE).

Figure 4:
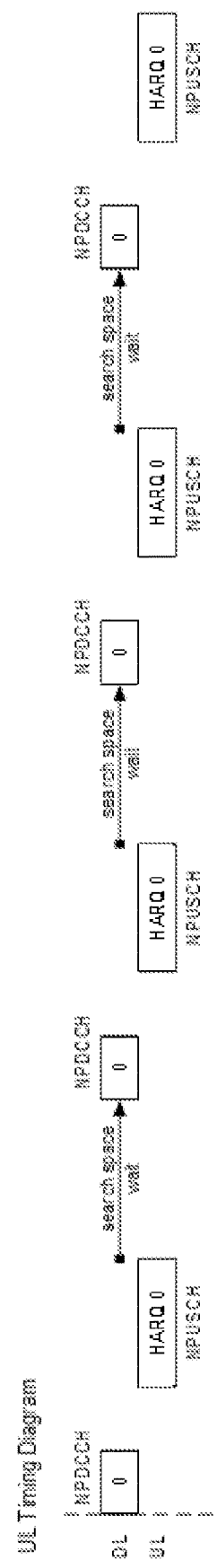
FIG. 4 shows a block diagram of a message transmission in NB-IoT.

FIG. 4 shows a block diagram of message transmission in NB-IoT. In this example, for NB-IoT, the TBS index (I_TBS)=0 and, using ten resource units (RU), the transport block size (TBS) is 256 bits. A 100 byte data packet thus requires four packet transmissions (and thus four scheduling grants). Each scheduling grant involves a wait for the next control channel search space.

Each scheduling grant consumes control channel (narrowband physical downlink control channel (NPDCCH) or MTC physical downlink control channel (MPDCCH)) resource. Control channel resource may consume up to half the resources as the data channel since each downlink control information (DCI) contains approximately 30 to 40 bits and has a target block error rate (BLER) of 1% (compared to 10% for data channel). Latency for data packet transmission may be increased due to the need to wait for the next control channel search space.

Semi-persistent scheduling has been introduced in Rel-8 LTE. An activation and a deactivation DCI is required. Semi-persistent scheduling may be suitable if a UE has periodic data transmission (e.g. voice over LTE (VoLTE)) but may be inefficient if a UE only requires several transmissions before going back to sleep.

Using one DCI to schedule multiple transport blocks has been discussed generally but without details of how to schedule multiple transport blocks and include interlaced transmission.

Figure 5:
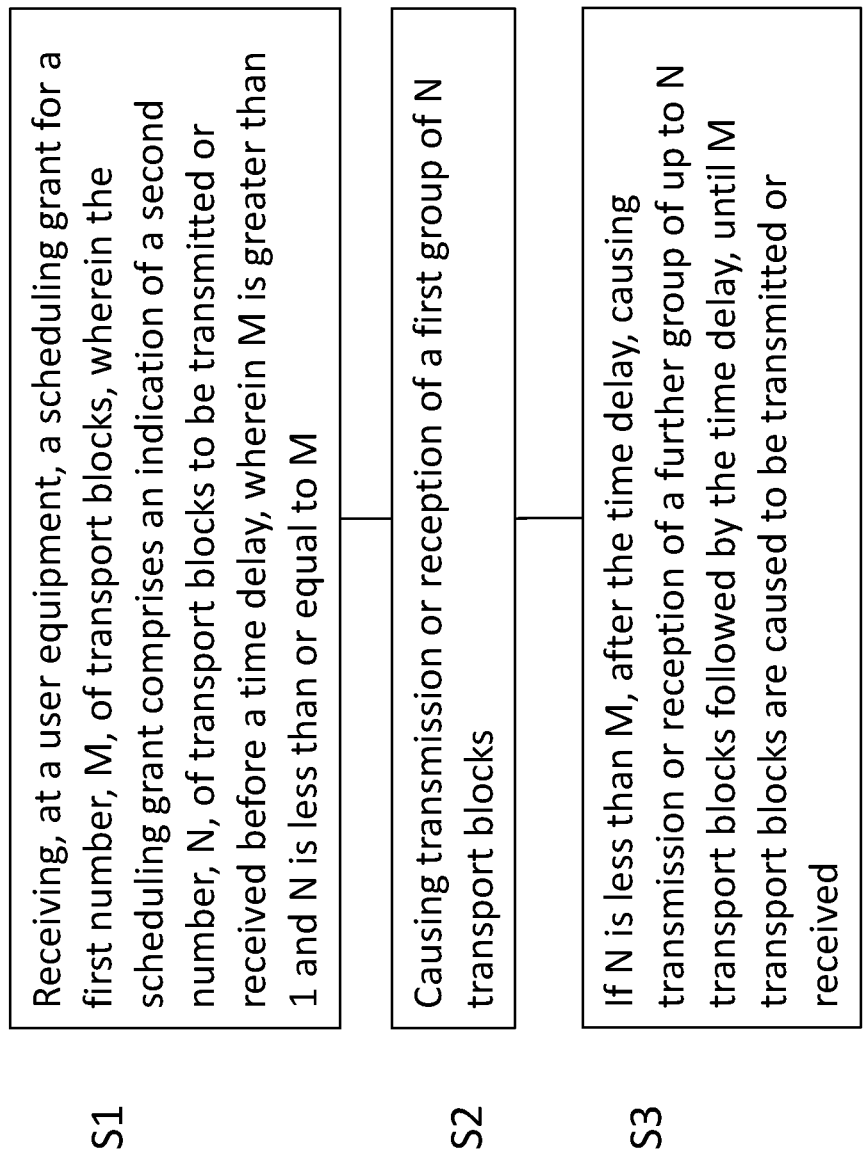
FIG. 5 shows a flowchart of a method according to an embodiment.

FIG. 5 shows a flowchart of a method which provides one scheduling grant to schedule multiple transport blocks. The method of FIG. 5 may be performed at a user equipment.

In a first step, S1, the method comprises receiving, at a user equipment, a scheduling grant for a first number, M, of transport blocks, wherein the scheduling grant comprises an indication of a second number, N, of transport blocks to be transmitted or received before a time delay, wherein M is greater than 1 and N is less than or equal to M.

In a second step, S2, the method comprises causing transmission or reception of a first group of N transport blocks.

In a third step, S3, performed if N is less than M, the method comprises, after the time delay, causing transmission or reception of a further group of up to N transport blocks followed by the time delay, until M transport blocks are caused to be transmitted or received.

Figure 6:
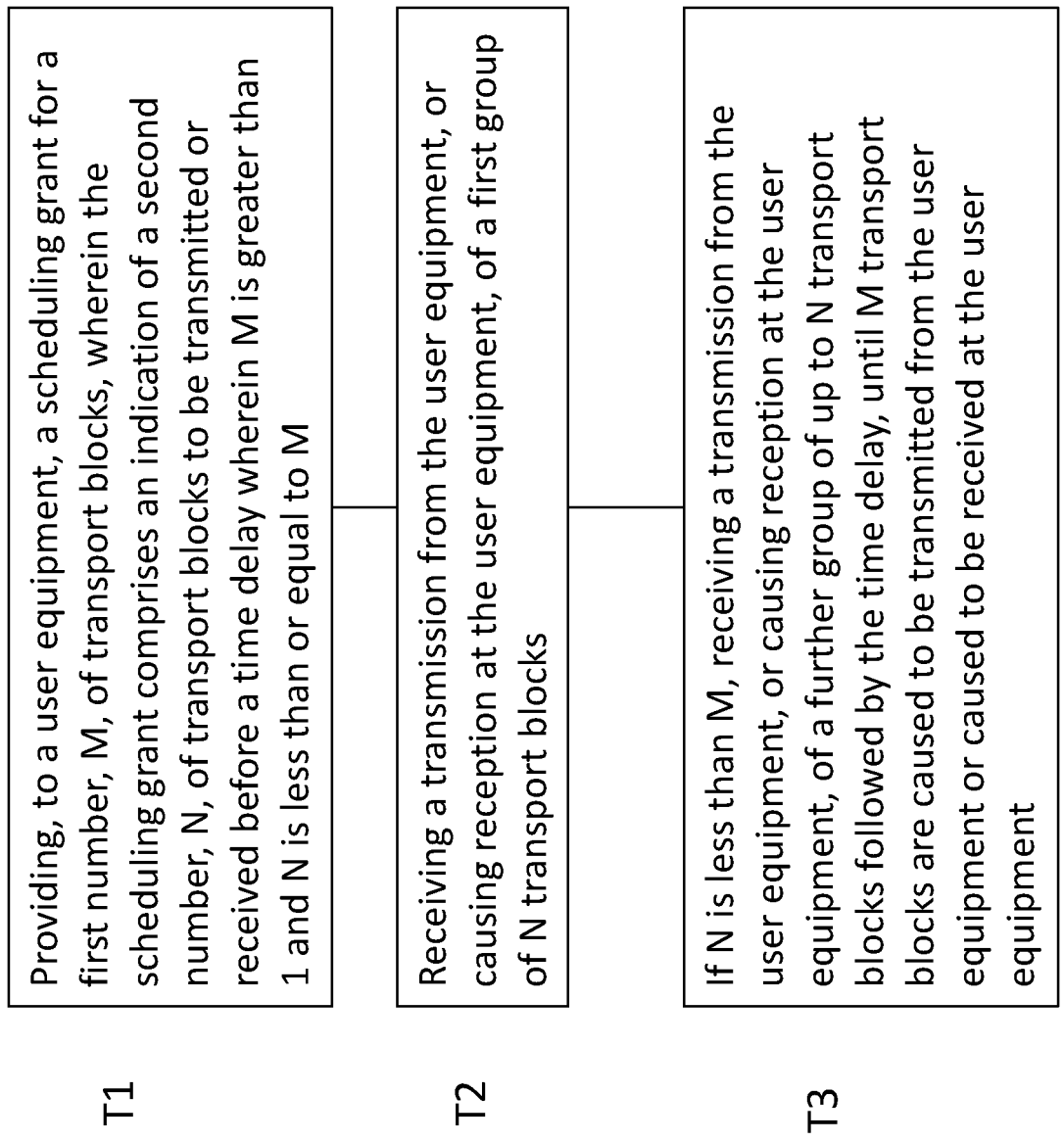
FIG. 6 shows a flowchart of a method according to an embodiment.

FIG. 6 shows a flowchart of a method which provides one scheduling grant to schedule multiple transport blocks. The method of FIG. 6 may be performed at a network entity.

In a first step, T1, the method comprises providing, to a user equipment, a scheduling grant for a first number, M, of transport blocks, wherein the scheduling grant comprises an indication of a second number, N, of transport blocks to be transmitted or received by the user equipment before a time delay, wherein M is greater than 1 and N is less than or equal to M.

In a second step T2, the method comprises receiving a transmission from the user equipment or causing reception at the user equipment, of a first group of N transport blocks.

In a third step, T3, performed if N is less than M, the method comprises, after the time delay, receiving a transmission from the user equipment, or causing reception at the user equipment, of a further group of up to N transport blocks followed by the time delay, until M transport blocks are caused to be transmitted from the user equipment or caused to be received at the user equipment.

The method may comprise receiving or providing feedback for the transmission or reception of each group of up to N transport blocks, respectively, wherein the feedback is received or provided after the transmission or reception of the up to N transport blocks and before a successive transmission or reception of the up to N transport blocks. The feedback maybe hybrid automatic repeat request (HARQ) feedback. Receiving or providing feedback may comprise completing at least one HARQ procedure (which may be UL HARQ or DL HARQ) including potential re-transmission. A UE may be capable of supporting a single HARQ process or multiple HARQ processes (for example based on UE's category and capability).

Alternatively, transmission may be supported without any feedback (for example, by ensuring that the transmission would be correctly decoded with a very high probability).

The scheduling grant may comprise a downlink control indicator (DCI).

In an example, a DCI includes a field indicating the number of transport blocks (N) before a gap (the time delay between the transmission or reception of successive groups of N transport blocks) for HARQ completion.

N may be greater than or equal to 1. N may be less than or equal to the number of HARQ processes supported by the user equipment. That is, the division of M TBs into groups of N TBs may be based on the number of HARQ processes a UE is capable of supporting.

M may or may not be an integer multiple of N. If M is not an integer multiple of N (e.g., if M=5 and N=2), the last transmission comprises less than N transport blocks.

The indication of N may support continuous transmission (1 TB after another) or stop-and-wait (wait for N Tx to complete before starting another transmission). For example, if a UE supports two HARQ processes, every allocation of two transport blocks should have a gap (or time delay) for the completion of the HARQ process(es) for earlier transmissions.

The method thus provides a single DCI which may schedule multiple TBs for a single HARQ process and also for multiple HARQ processes.

The scheduling grant may comprise an indication of the first number M of transport blocks.

In an example, a DCI includes a field indicating the number of transport blocks (M). Alternately, a single bit or reserved state may be used to indicate whether a UE will calculate the number M of transport blocks derived from the last reported buffer status report (BSR) and a TBS field indicated by DCI.

The scheduling grant may include an indication of a time delay (i.e. a gap) between transmission or reception of transport blocks within a group of N or fewer transport blocks. The time delay may allow time-multiplexing of other data into the gap (to avoid blocking).

The time delay value (common for each pair of successive transport blocks within the group) may be indicated in the scheduling grant.

In one embodiment, a DCI includes a field indicating a time delay (and optionally a time delay value) between successive transport blocks within a group of up to N transport blocks.

In an alternative embodiment, the transmission time delay value between successive transport blocks within a group of N or fewer transport blocks for each group of up to N transport blocks may be separately indicated in the DCI.

The scheduling grant may include an indication of a time delay value between transmission or reception of successive groups of transport blocks (i.e. the time delay between groups of N or fewer transport blocks).

In an example, a DCI includes a field indicating a time delay value for HARQ completion.

The scheduling grant may include an indication of whether to cause interlaced or interleaved transmission or reception. Up to N transport blocks may be interlaced together in a subframe or group of subframes basis (e.g.

group of subframes can be based on cyclic repetition in eMTC). A periodic gap (for example, a X ms gap every 40 ms) may be provided during the interlaced transmission. The periodic gap may avoid blocking (i.e. avoid not being able to schedule or transmit to other user due to on-going transmission).

In an example, a DCI includes a field comprising an interlaced or interleaved transmission or reception indication.

The scheduling grant may comprise an indication of at least one HARQ process identifier.

In an example, a DCI includes a HARQ process ID indication.

The feedback may comprise acknowledgment or negative acknowledgment (ACK/NACK).

If the UE is capable of supporting multiple HARQ processes, the feedback may include multiple ACK/NACK for multiple HARQ processes (e.g. bitmap of ACK/NACK or multiplexed ACK/NACK), each ACK/NACK associated with one HARQ process ID. UE/eNB acknowledges and/or terminates (if it is ongoing) the corresponding transmission for the received ACK. Retransmission may either reuse the same transmission scheme as indicated in the initial DCI, or a new DCI can be used by eNB. For multiple bit ACK/NACK, eNB may indicate ACK/NACK in the order of TB index.

Alternatively, if, for example, the UE is configured to support bundled ACK/NACK, there may be one ACK/NACK for multiple TBs of the HARQ process. With one (e.g. one bit) ACK, a UE/eNB acknowledges the consecutively received TBs and considers all transmitted TBs and ongoing TB transmission until ACK reception as successful.

In an example embodiment, after receiving the scheduling grant (e.g. DCI) from the network, a UE transmits N transport blocks. The N transport blocks may be transmitted sequentially in time (in order of HARQ process ID number), interlaced in time (which may provide time diversity) and with or without a gap.

Figure 7:
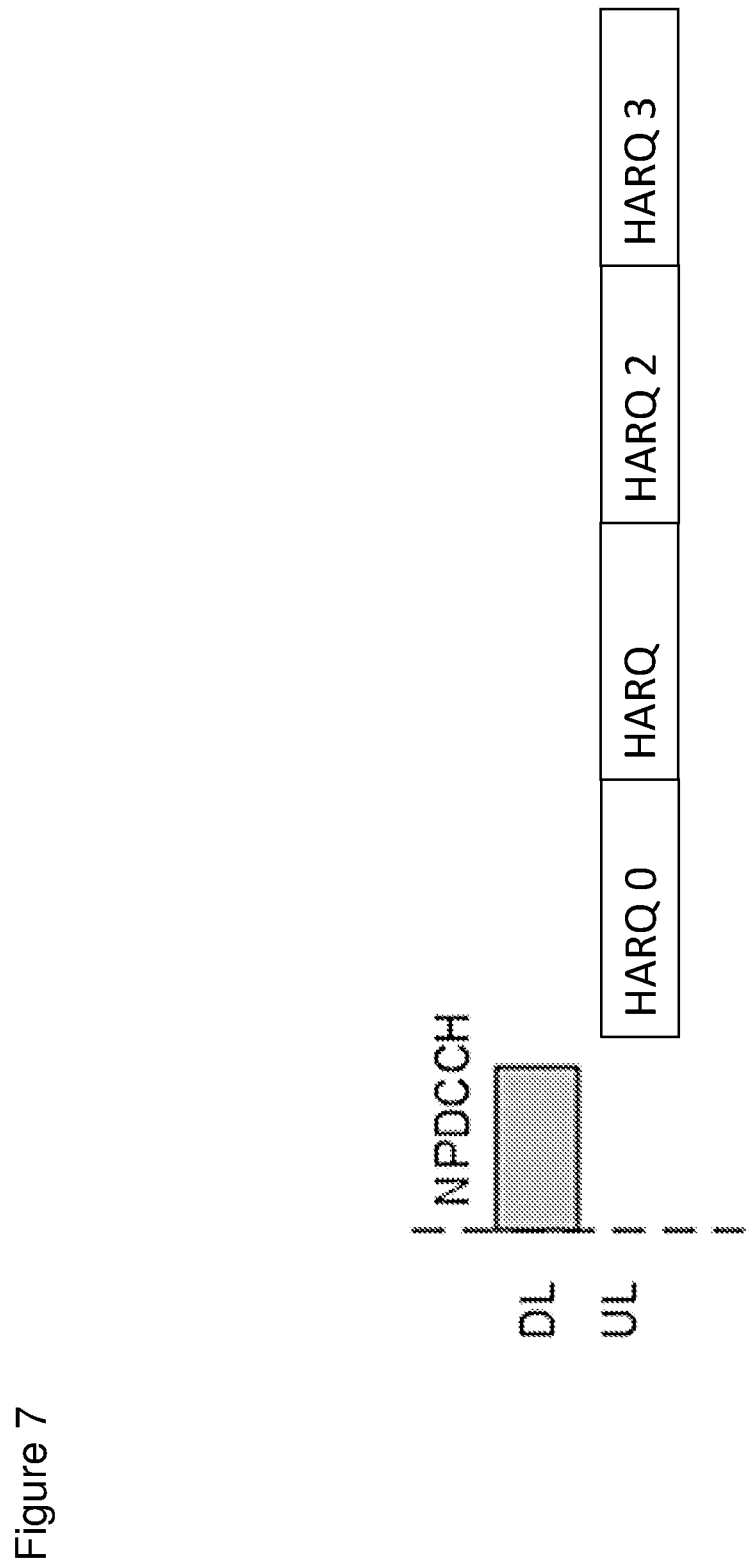
FIG. 7 shows a block diagram of a transport block transmission according to an embodiment.

FIG. 7 shows a block diagram of an example transmission of N transport blocks sequentially in order of HARQ process ID number, where four HARQ processes are supported and N=4.

Figure 8:
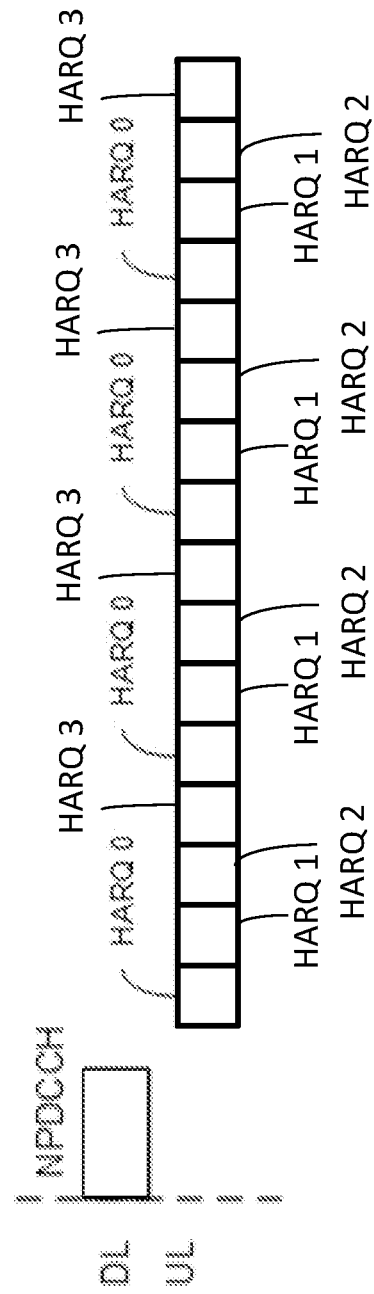
FIG. 8 shows a block diagram of a transport block transmission according to an embodiment.

FIG. 8 shows a block diagram of an example interlaced transmission of N transport blocks, where four HARQ processes are supported and N=4.

After transmission of N transport blocks, the UE then waits for HARQ completion before transmitting another group of N transport blocks, until all M blocks are transmitted.

Figure 9:
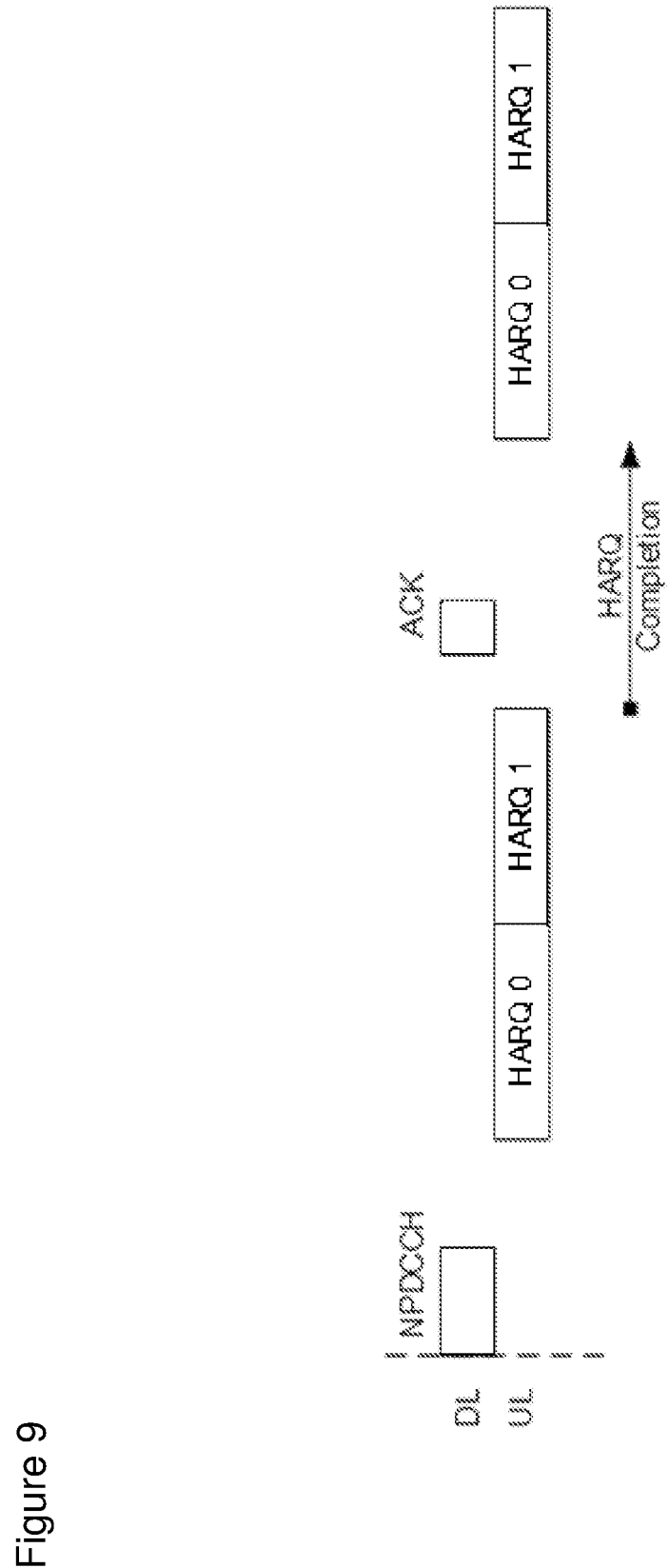
FIG. 9 shows a block diagram of a message transmission according to an embodiment.

FIG. 9 shows a block diagram of example of transport block transmission, where M=4, N=2. The UE/eNB is capable of supporting two HARQ processes. In this example, the transmission is non-interlaced and there is continuous transmission. A DCI is provided in NPDCCH. The UE transmits two transport blocks in sequential order of HARQ process ID number. There is then a transmission gap (time delay) for HARQ completion before a successive transmission of two transport blocks. The ACK block shown in FIGS. 9 to 11 may be a 1-bit (bundled) ACK or N-bit (multiplexed or bitmap) ACK.

Figure 10:
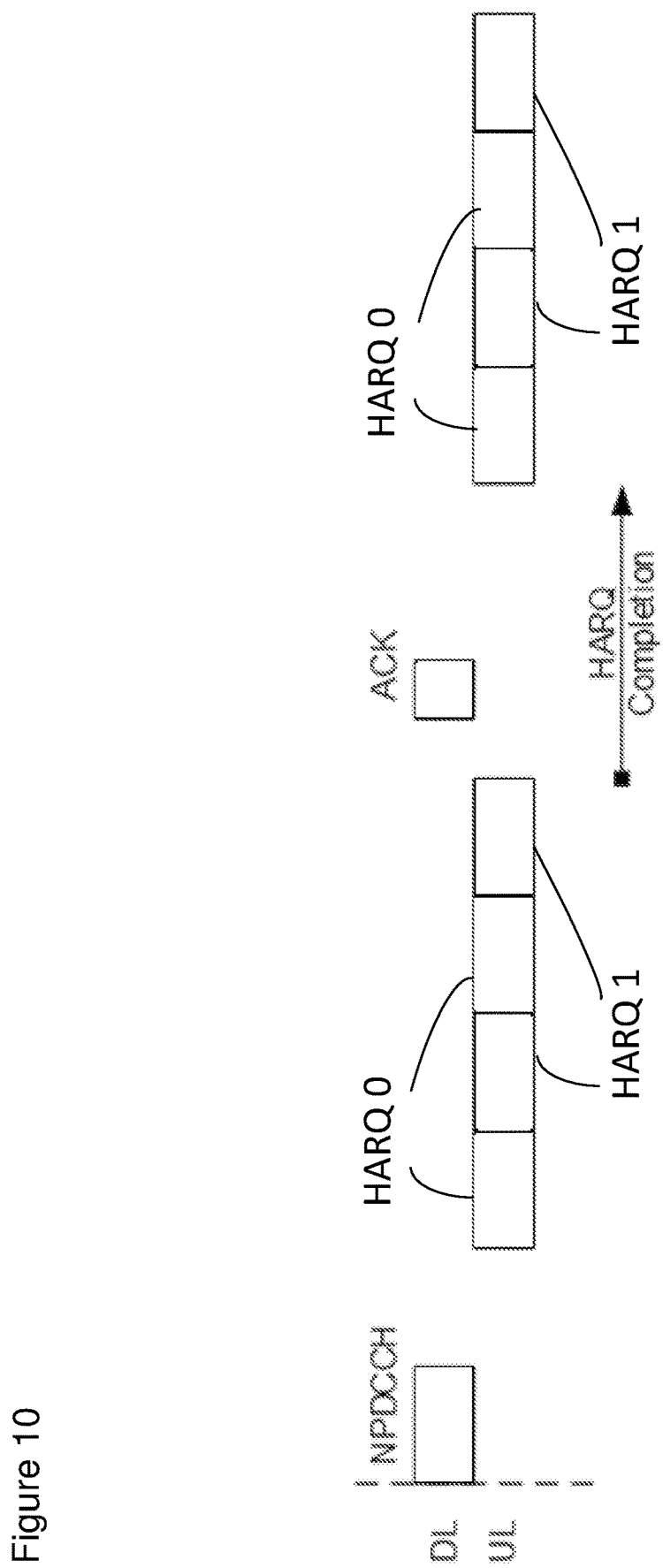
FIG. 10 shows a block diagram of a message transmission according to an embodiment.

FIG. 10 shows a block diagram of example of transport block transmission, where M=4, N=2. The UE/eNB is capable of supporting two HARQ processes. The transmission in this example is interlaced and there is continuous transmission. A DCI is provided in NPDCCH. The UE transmits two interlaced transport blocks. There is then a transmission gap (time delay) for HARQ completion before a successive transmission of two interlaced transport blocks.

Figure 11:
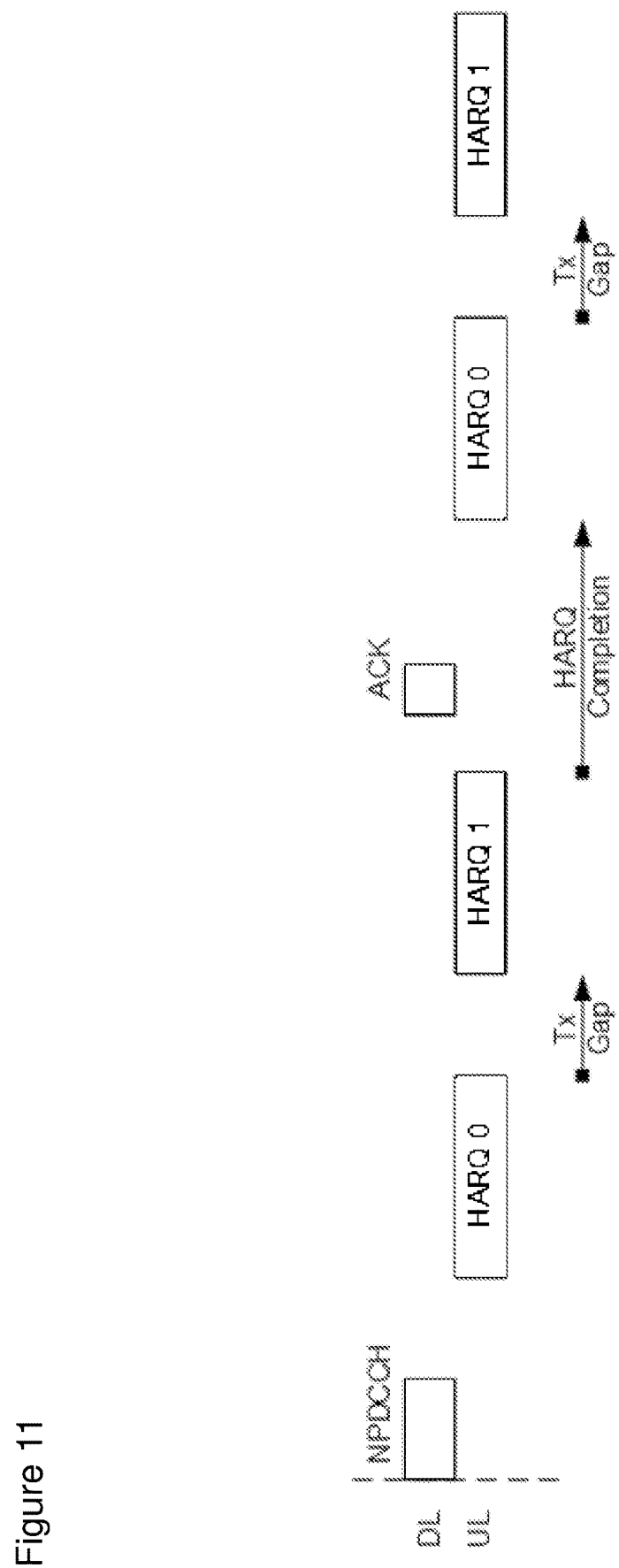
FIG. 11 shows a block diagram of a message transmission according to an embodiment.

FIG. 11 shows a block diagram of example of transport block transmission, where M=4, N=2. In this example, the transmission is non-interlaced. There is a transmission gap within the transmission of N transport blocks. The UE/eNB is capable of supporting two HARQ processes. A DCI is provided in NPDCCH. The UE transmits one transport block followed by a second transport block in order of HARQ process ID number. There is a time delay in between transmission of the first and second transport block. There is then a transmission gap (time delay) for HARQ completion before a successive transmission of two transport blocks with a transmission gap between them.

Although the examples of FIGS. 7 to 11 depict UL transmission by a UE, the method may be applied to DL transmission (e.g. where a UE receives a scheduling grant for DL transmissions and acknowledges DL transmission).

A method as described above may reduce control channel overhead and latency.

Interlaced transmission may provide additional time-domain diversity.

Total transmission is broken up into group of N transport blocks to take advantage of UE HARQ capability.

The method may be implemented in a user equipment as described with reference to FIG. 2 or a control apparatus as described with reference to FIG. 3.

An apparatus may comprise means for receiving, at a user equipment, a scheduling grant for a first number, M, of transport blocks, wherein the scheduling grant comprises an indication of a second number, N, of transport blocks to be transmitted or received before a time delay, wherein M is greater than 1 and N is less than or equal to M, causing transmission or reception of a first group of N transport blocks and, if N is less than M, after the time delay, causing transmission or reception of a further group of up to N transport blocks followed by the time delay, until M transport blocks are caused to be transmitted or received.

Alternatively or in addition, an apparatus may comprise means for providing, to a user equipment, a scheduling grant for a first number, M, of transport blocks, wherein the scheduling grant comprises an indication of a second number, N, of transport blocks to be transmitted or received by the user equipment before a time delay, wherein M is greater than 1 and N is less than or equal to M, receiving a transmission from the user equipment, or causing reception at the user equipment, of a first group of N transport blocks and, if N is less than M, after the time delay, receiving a transmission from the user equipment, or causing reception at the user equipment, of a further group of up to N transport blocks from the user equipment followed by the time delay, until M transport blocks are caused to be transmitted from the user equipment or caused to be received at the user equipment.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to NB IoT and eMTC, similar principles can be applied in relation to other networks and communication systems where the amount of data in a transmission is limited. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

What is claimed is:

1. An apparatus, comprising:
at least one processor; and
at least one memory including computer program code;
the at least one memory and the computer program code being configured to, with the at least one processor, cause the apparatus at least to perform:
receiving, at a user equipment, a scheduling grant for a first number, M, of transport blocks, wherein the scheduling grant comprises an indication of the first number, M, of transport blocks and of a second number, N, of transport blocks to be transmitted or received, wherein M is greater than 1 and N is less than or equal to M;
causing transmission or reception of a first group of N transport blocks;
if N is less than M, causing transmission or reception of a further group of up to N transport blocks, until M transport blocks are caused to be transmitted or received, wherein each successive transmission or reception of a group of N transport blocks is followed by a time delay; and
receiving or providing a HARQ feedback for transmission or reception of each group of up to N transport blocks, respectively, wherein the HARQ feedback is received or provided in the time delay after the transmission or reception of the up to N transport blocks and before a successive transmission or reception of the up to N transport blocks, wherein the scheduling grant comprises a downlink control information including a field indicating the number of transport blocks N before the time delay.

2. The apparatus according to claim 1, wherein the scheduling grant comprises an indication of a time delay value between transmission or reception of successive groups of up to N transport blocks.

3. The apparatus according to claim 1, wherein the scheduling grant comprises an indication of a time delay between transmission or reception of the transport blocks within a group of up to N transport blocks.

4. The apparatus according to claim 1, wherein the scheduling grant comprises an indication of whether to cause interlaced transmission or reception of the transport blocks with a group of N transport blocks.

5. The apparatus according to claim 1, wherein N is less than or equal to the number of HARQ processes supported by the user equipment.

6. The apparatus according to claim 1, wherein the scheduling grant comprises an indication of at least one HARQ process identifier.

7. The apparatus according to claim 6, wherein said at least one memory and said computer program code are configured, with said at least one processor, to cause the apparatus to further perform receiving or providing feedback associated with the at least one HARQ process identifier.

8. The apparatus according to claim 1, wherein said at least one memory and said computer program code are configured, with said at least one processor, to cause the apparatus to further perform receiving or providing feedback associated with a plurality of transport blocks.

9. A method, comprising:

receiving, at a user equipment, a scheduling grant for a first number, M, of transport blocks, wherein the scheduling grant comprises an indication of the first number, M, of transport blocks and of a second number, N, of transport blocks to be transmitted or received, wherein M is greater than 1 and N is less than or equal to M;

causing transmission or reception of a first group of N transport blocks;

in response to N being less than M, causing transmission or reception of a further group of up to N transport blocks, until M transport blocks are caused to be transmitted or received, wherein each successive transmission or reception of a group of N transport blocks is followed by a time delay; and receiving or providing a hybrid automatic repeat request (HARQ) feedback for transmission or reception of each group of up to N transport blocks, respectively, wherein the HARQ feedback is received or provided in the time delay after the transmission or reception of the up to N transport blocks and before a successive transmission or reception of the up to N transport blocks, wherein the scheduling grant comprises a downlink control information including a field indicating the number of transport blocks N before the time delay.

10. A computer program embodied on a non-transitory computer readable medium, said computer program comprising program instructions which, when executed on an apparatus, cause the apparatus to perform the method of claim 9.

11. A method, comprising:

providing, to a user equipment, a scheduling grant for a first number, M, of transport blocks, wherein the scheduling grant comprises an indication of the first number, M, of transport blocks and a second number, N, of transport blocks to be transmitted or received by the user equipment, wherein M is greater than 1 and N is less than or equal to M;

receiving a transmission from the user equipment, or causing reception at the user equipment, of a first group of N transport blocks;

in response to N being less than M, receiving a transmission from the user equipment, or causing reception at the user equipment, of a further group of up to N transport blocks from the user equipment, until M transport blocks are caused to be transmitted from the user equipment or caused to be received at the user equipment, wherein each successive transmission or reception of a group of N transport blocks is followed by a time delay; and receiving or providing a hybrid automatic repeat request (HARQ) feedback for transmission or reception of each group of up to N transport blocks, respectively, wherein the HARQ feedback is received or provided in the time delay after the transmission or reception of the up to N transport blocks and before a successive transmission or reception of the up to N transport blocks, wherein the scheduling grant comprises a downlink control information including a field indicating the number of transport blocks N before the time delay.

12. The method of claim 9, wherein the scheduling grant comprises an indication of the first number, M, of transport blocks.

13. The method of claim 9, wherein the scheduling grant comprises an indication of a time delay value between transmission or reception of successive groups of up to N transport blocks.

14. The method of claim 9, wherein the scheduling grant comprises an indication of a time delay between transmission or reception of the transport blocks within a group of up to N transport blocks.

15. The method of claim 9, wherein the scheduling grant comprises an indication of whether to cause interlaced transmission or reception of the transport blocks with a group of N transport blocks.

16. An apparatus, comprising:

at least one processor; and at least one memory including computer program code;

the at least one memory and the computer program code being configured to, with the at least one processor, cause the apparatus at least to perform:

providing, to a user equipment, a scheduling grant for a first number, M, of transport blocks, wherein the scheduling grant comprises an indication of the first number, M, of transport blocks and of a second number, N, of transport blocks to be transmitted or received by the user equipment, wherein M is greater than 1 and N is less than or equal to M;

receiving a transmission from the user equipment, or causing reception at the user equipment, of a first group of N transport blocks;

if N is less than M, receiving a transmission from the user equipment, or causing reception at the user equipment, of a further group of up to N transport blocks, until M transport blocks are caused to be transmitted from the user equipment or caused to be received at the user equipment wherein each successive transmission or reception of a group of N transport blocks is followed by a time delay; and receiving or providing a hybrid automatic repeat request (HARQ) feedback for transmission or reception of each group of up to N transport blocks, respectively, wherein the HARQ feedback is received or provided in the time delay after the transmission or reception of the up to N transport blocks and before a successive transmission or reception of the up to N transport blocks, wherein the scheduling grant comprises a downlink control information including a field indicating the number of transport blocks N before the time delay.

17. A computer program embodied on a non-transitory computer readable medium, said computer program comprising program instructions which, when executed on an apparatus, cause the apparatus to perform the method of claim 11.

* * * * *